(12) United States Patent
Yue et al.

(10) Patent No.: US 11,343,713 B2
(45) Date of Patent: May 24, 2022

(54) DATA PROCESSING METHOD, TRANSMITTER AND RECEIVER

(71) Applicant: VIVO MOBILE COMMUNICATION CO., LTD., Chang'an Dongguan (CN)

(72) Inventors: Ran Yue, Chang'an Dongguan (CN); Wei Bao, Chang'an Dongguan (CN); Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 27 days.

(21) Appl. No.: 16/639,614

(22) PCT Filed: Aug. 15, 2018

(86) PCT No.: PCT/CN2018/100633
§ 371 (c)(1),
(2) Date: Feb. 17, 2020

(87) PCT Pub. No.: WO2019/034073
PCT Pub. Date: Feb. 21, 2019

(65) Prior Publication Data
US 2020/0187049 A1 Jun. 11, 2020

(30) Foreign Application Priority Data
Aug. 17, 2017 (CN) .......................... 201710707996.3

(51) Int. Cl.
*H04W 4/00* (2018.01)
*H04W 28/04* (2009.01)
(Continued)

(52) U.S. Cl.
CPC ........... *H04W 28/04* (2013.01); *H04W 76/30* (2018.02); *H04W 80/02* (2013.01)

(58) Field of Classification Search
USPC ................................. 370/328, 329, 330, 331
See application file for complete search history.

(56) References Cited

U.S. PATENT DOCUMENTS

| 10,764,815 B2* | 9/2020 | Park ................. H04W 72/0413 |
| 2010/0165937 A1 | 7/2010 | Yi et al. |

(Continued)

FOREIGN PATENT DOCUMENTS

| CN | 101854735 A | 10/2010 |
| CN | 102265700 A | 11/2011 |

(Continued)

OTHER PUBLICATIONS

Chinese Search Report Application No. 201710707996.3; dated Jun. 2, 2020.

(Continued)

*Primary Examiner* — David Q Nguyen
(74) *Attorney, Agent, or Firm* — von Briesen & Roper, s.c.

(57) ABSTRACT

Embodiments of the disclosure relate to a data processing method, a transmitter, and a receiver. The method includes: determining whether a current radio bearer is an only radio bearer corresponding to an SDAP entity of a receiver; releasing the SDAP entity in case that the current radio bearer is the only radio bearer corresponding to the SDAP entity; releasing a configuration corresponding to the current radio bearer in case that the current radio bearer is not the only radio bearer corresponding to the SDAP entity.

5 Claims, 7 Drawing Sheets

(51) Int. Cl.
*H04W 76/30* (2018.01)
*H04W 80/02* (2009.01)

(56) References Cited

U.S. PATENT DOCUMENTS

| | | |
|---|---|---|
| 2017/0280486 A1 | 9/2017 | Lee et al. |
| 2017/0280501 A1 | 9/2017 | Xu et al. |
| 2018/0270713 A1* | 9/2018 | Park ...................... H04L 5/0053 |
| 2019/0028920 A1* | 1/2019 | Pan ....................... H04W 76/12 |
| 2019/0306918 A1 | 10/2019 | Cho et al. |
| 2020/0221526 A1* | 7/2020 | Jin ........................ H04W 76/27 |
| 2021/0112442 A1* | 4/2021 | Jiang ................. H04W 72/1284 |

FOREIGN PATENT DOCUMENTS

| | | |
|---|---|---|
| CN | 106717052 A | 5/2017 |
| CN | 106717108 A | 5/2017 |
| WO | WO 2017/007147 A1 | 1/2017 |

OTHER PUBLICATIONS

European Search Report Application No. 18845947.3; dated May 26, 2020.
Huawei Hisilicon, "QoS message flows", 3GPP TSG-RAN WG2Meeting #98, R2-1704977, Hangzhou, China, May 15, 2017-May 19, 2017.

\* cited by examiner

DATA PROCESSING METHOD, TRANSMITTER AND RECEIVER

CROSS-REFERENCE TO RELATED APPLICATION

This application is a U.S. national phase application of a PCT Application No. PCT/CN2018/100633 filed on Aug. 15, 2018, which claims a priority to Chinese Patent Application No. 201710707996.3, filed in China on Aug. 17, 2017, the disclosure of which is incorporated in its entirety herein by reference.

TECHNICAL FIELD

Embodiments of the present disclosure relate to the field of communication technology, and in particular to a data processing method, a transmitter and a receiver.

BACKGROUND

In case that a radio bearer (RB) is released, a packet data convergence protocol (PDCP) entity should deliver currently stored service data units (SDUs) to a higher layer in sequence, to reduce loss of data packets.

However, the related technical solutions in regard of reducing loss of data packets are incomplete in that related processes in a higher layer or lower layer relative to the PDCP are not specified.

SUMMARY

In a first aspect, a data processing method is provided, which is applied to a receiver and includes:
  determining whether a current radio bearer is an only radio bearer corresponding to a service data adaptation protocol (SDAP) entity of the receiver;
  releasing the SDAP entity in case that the current radio bearer is the only radio bearer corresponding to the SDAP entity;
  releasing a configuration corresponding to the current radio bearer in case that the current radio bearer is not the only radio bearer corresponding to the SDAP entity.

In a second aspect, a data processing method is further provided, which is applied to a transmitter and includes:
  determining a buffer status report (BSR) triggered by a logical channel corresponding to one or at least two radio bearers;
  prior to transmitting the BSR, canceling the triggered BSR in case that a request to release the one or at least two radio bearers is received or a request to release a PDCP entity corresponding to the one or at least two radio bearers is received.

In a third aspect, a receiver is further provided, including:
  a first determination module, configured to determine whether a current radio bearer is an only radio bearer corresponding to an SDAP entity of the receiver,
  a first release module, configured to release the SDAP entity in case that the first determination module determines that the current radio bearer is the only radio bearer corresponding to the SDAP entity;
  a second release module, configured to release a configuration corresponding to the current radio bearer in case that the first determination module determines that the current radio bearer is not the only radio bearer corresponding to the SDAP entity.

In a fourth aspect, a transmitter is further provided, including:
  a determination module, configured to determine a buffer status report (BSR) triggered by a logical channel corresponding to one or at least two radio bearers;
  a first cancellation module, configured to, prior to transmitting the BSR, cancel the triggered BSR in case that a request to release the one or at least two radio bearers is received or a request to release a PDCP entity corresponding to the one or at least two radio bearers is received.

In a fifth aspect, a receiver is further provided, including a processor, a storage, and a data processing program stored in the storage and executable by the processor, where the processor is configured to execute the data processing program, to implement steps of the data processing method as described in the first aspect.

In a sixth aspect, a transmitter is further provided, including a processor, a storage, and a data processing program stored in the storage and executable by the processor, where the processor is configured to execute the data processing program, to implement steps of the data processing method as described in the second aspect.

In a seventh aspect, a computer readable storage medium storing therein a data processing program is provided, where the data processing program is configured to be executed by a processor to implement steps of the data processing method as described in the first aspect, or to implement steps of the data processing method as described in the second aspect.

BRIEF DESCRIPTION OF THE DRAWINGS

Various other advantages and benefits will become apparent to those of ordinary skill in the art upon reading the detailed description of optional embodiments below. The drawings are only for the purpose of illustrating optional embodiments and are not to be considered as limiting the present disclosure. Moreover, the same reference numerals are used throughout the drawings to refer to the same components. In the drawings.

DETAILED DESCRIPTION

In order to make the objects, technical solutions and advantages of the present disclosure more clear, the technical solutions of the present disclosure will be clearly and completely described below with reference to the drawings of the present disclosure, apparently, the described embodiments are some embodiments of the present disclosure, but are not all the embodiments. Based on the embodiments of the present disclosure, all other embodiments derived by a person of ordinary skill in the art without any creative efforts shall fall within the scope of the present disclosure.

In addition, the terms "include" and "have" and any variants thereof are intended to cover non-exclusive inclusions, for example, a process, method, a system, a product, or a device that includes a series of steps or units is not necessarily limited to those steps or units clearly listed, but may include other steps or units not explicitly listed or inherent to such processes, methods, products or devices.

The user terminal in embodiments of the present disclosure may be a wireless terminal or a wired terminal, and the wireless terminal may refer to a device that provides voice and/or other service data connectivity to the user, a handheld device having a wireless connecting function, or other processing devices connected to a wireless modem. The wireless terminal can communicate with one or more core networks via a radio access network (RAN), and the wireless terminal can be a mobile terminal, such as a mobile phone (or referred to as "cellular" phone) and a computer having a mobile terminal, for example, a portable, pocket, handheld, computer built-in or in-vehicle mobile device that exchanges voice and/or data with wireless access network. For example, a personal communication service (PCS) telephone, a cordless telephone, a session initiation protocol (SIP) telephone, a wireless local loop (WLL) station, a personal digital assistant (PDA) or the like. The wireless terminal may also be referred to as a system, a subscriber unit, a subscriber station, a mobile station, a mobile, a remote station, a remote terminal, an access terminal, a user terminal, a user agent, or a user device or user equipment, which are not limited here.

In embodiments of the present disclosure, the network side device may refer to a base station, and the base station may be a base transceiver station (BTS) in the global system of mobile communication (GSM) or the code division multiple access (CDMA), a NodeB (NB) in the wideband code division multiple access (WCDMA), an evolutional Node B (eNB or eNodeB) in a long term evolution (LTE), a base station in new radio access technical (New RAT or NR) or a relay station or an access point, or a base station in a 5G network, etc., which is not limited here.

Figure 1:
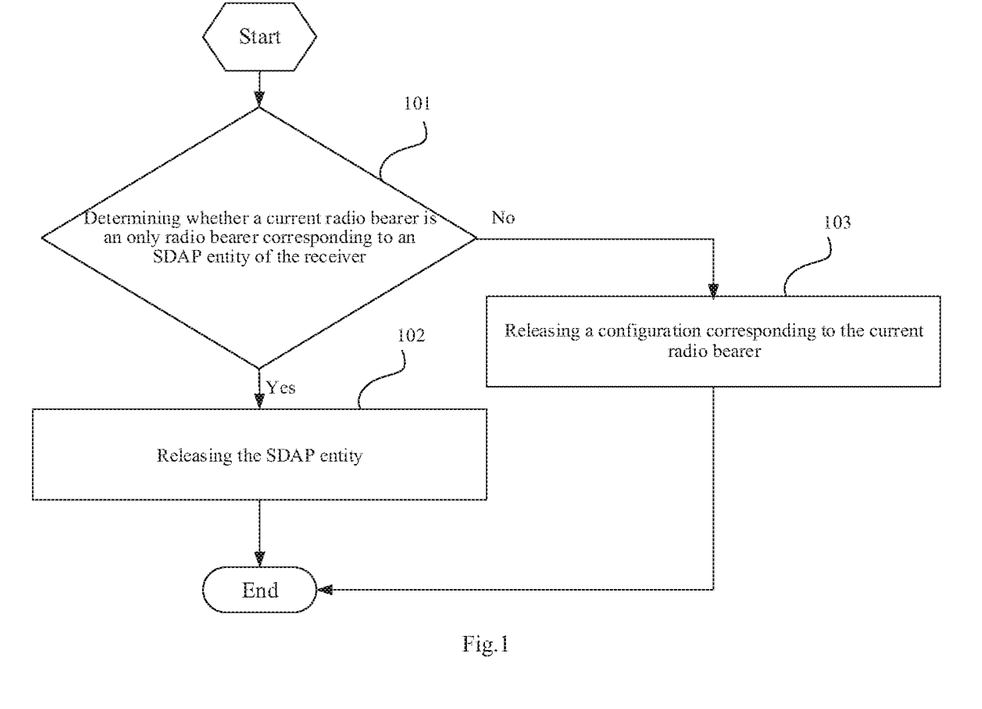
FIG. 1 is a first flow diagram illustrating a data processing method according to an embodiment of the present disclosure.

Referring to FIG. 1, a process of a data processing method according to an embodiment of the present disclosure is illustrated. The method is executed by a receiver, and the receiver may be a user terminal or a network side device. The method includes specific steps as follows.

A step 101 includes: determining whether a current radio bearer is an only radio bearer corresponding to a service data adaptation protocol (SDAP) entity of the receiver. The process proceeds to a step 102 in case that the current radio bearer is the only radio bearer corresponding to the SDAP entity and proceeds to a step 103 in case that the current radio bearer is not the only radio bearer corresponding to the SDAP entity.

In the embodiment of the present disclosure, it is possible to determine whether the current radio bearer is the only radio bearer corresponding to the SDAP entity of the receiver by using means in the related art, which is not described here.

It should be noted that the current radio bearer includes one radio bearer or at least two radio bearers, for example, three radio bearers, four radio bearers, etc.

A step 102 includes: releasing the SDAP entity.

A step 103 includes: releasing a configuration corresponding to the current radio bearer.

In this way, the embodiments of the present disclosure provide a data processing solution for the receiver in a scenario of radio bearer release or PDCP entity release, so as to improve the system processing mechanism.

Figure 2:
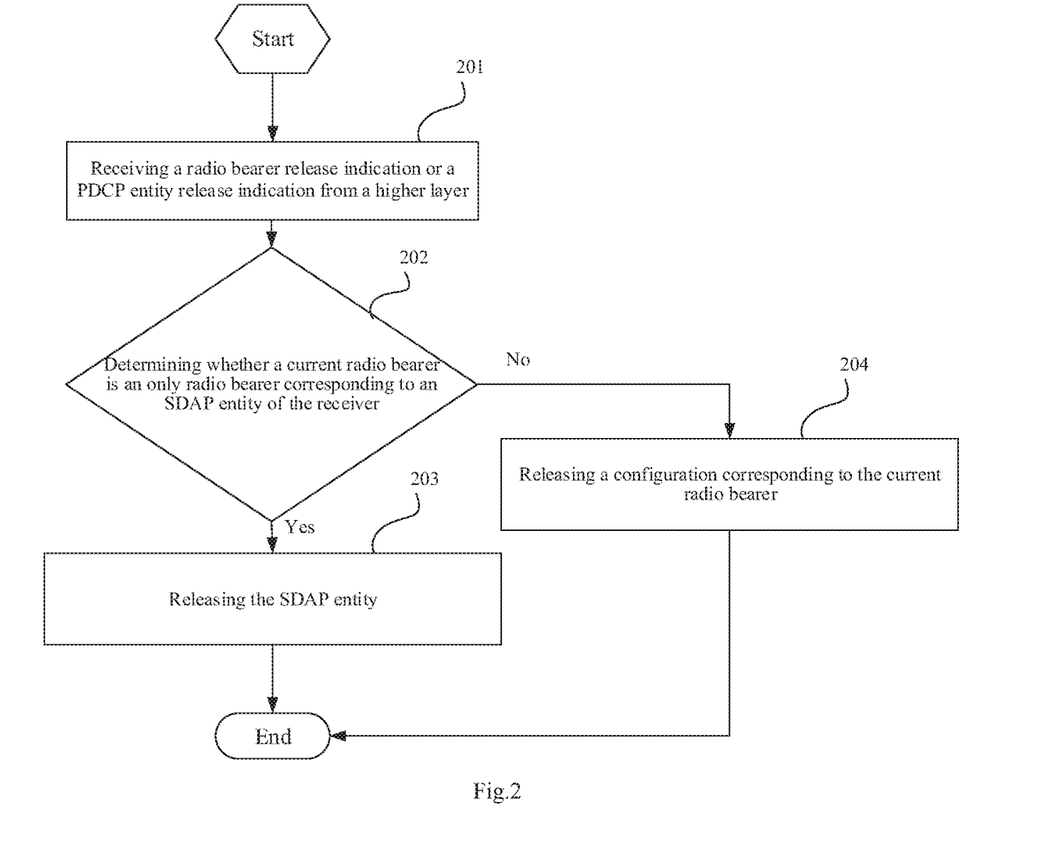
FIG. 2 is a second flow diagram illustrating a data processing method according to an embodiment of the present disclosure.

Referring to FIG. 2, a process of a data processing method according to an embodiment of the present disclosure is illustrated. The method is executed by a receiver, and the receiver may be a user terminal or a network side device. The method includes specific steps as follows.

A step 201 includes: receiving a radio bearer release indication or a packet data convergence protocol (PDCP) entity release indication from a higher layer.

A step 202 includes: determining whether a current radio bearer is an only radio bearer corresponding to an SDAP entity of the receiver. The process proceeds to a step 203 in case that the current radio bearer is the only radio bearer corresponding to the SDAP entity; and proceeds to a step 204 in case that the current radio bearer is not the only radio bearer corresponding to the SDAP entity.

It should be noted that the current radio bearer includes one radio bearer or at least two radio bearers, for example, three radio bearers, four radio bearers, etc.

A step 203 includes: releasing the SDAP entity.

A step 204 includes: releasing a configuration corresponding to the current radio bearer.

A step 205 includes: releasing a PDCP entity of the receiver.

It should be noted that the above step 205 and step 204 may be performed simultaneously or may be performed sequentially, that is, the step 205 is performed after the step 204 is performed.

In this way, the embodiments of the present disclosure provide a data processing solution for the receiver in a scenario of radio bearer release or PDCP entity release.

Figure 3:
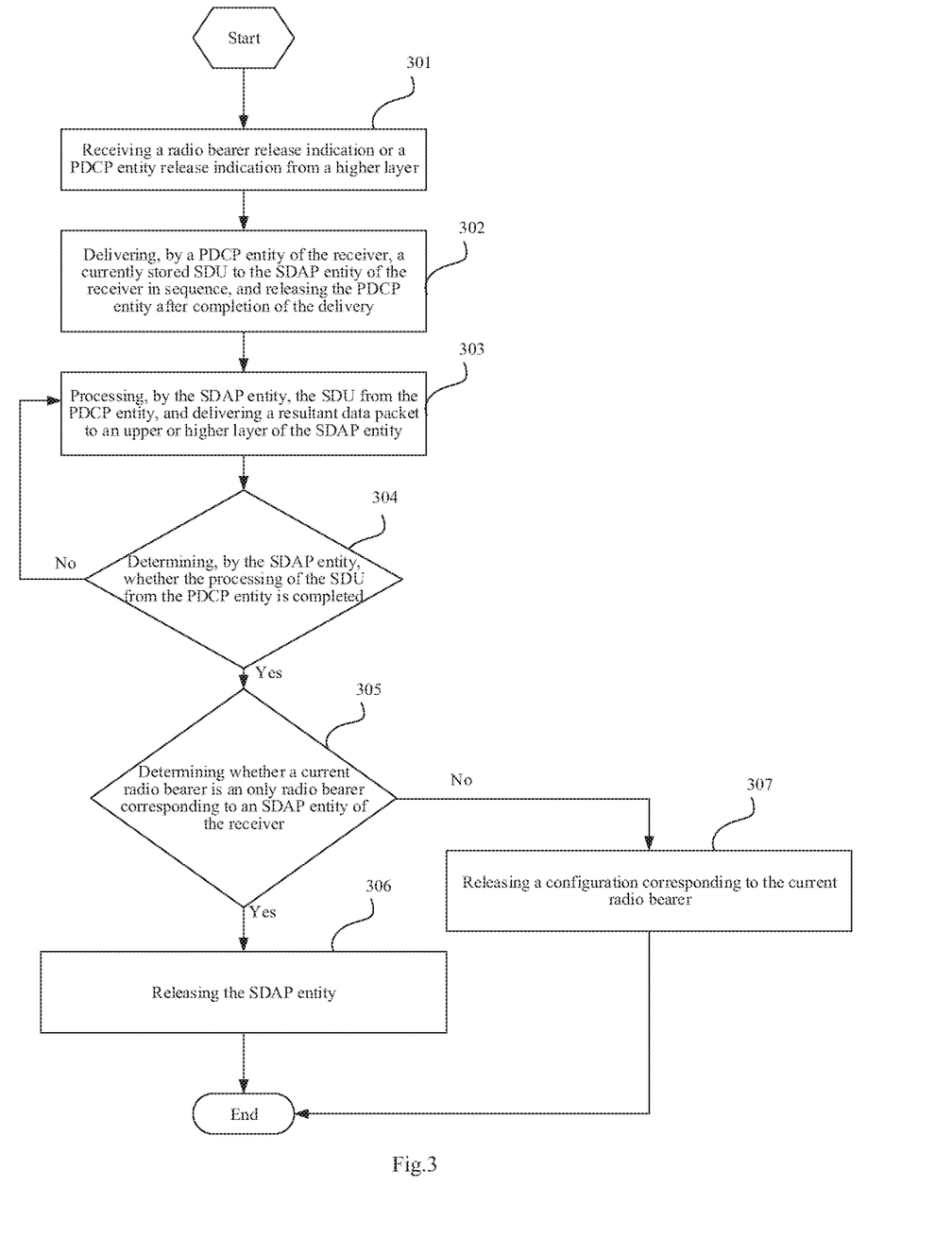
FIG. 3 is a third flow diagram illustrating a data processing method according to an embodiment of the present disclosure.

Referring to FIG. 3, a process of a data processing method according to an embodiment of the present disclosure is illustrated. The method is executed by a receiver, and the receiver may be a user terminal or a network side device. The method includes specific steps as follows.

A step 301 includes: receiving a radio bearer release indication or a packet data convergence protocol (PDCP) entity release indication from a higher layer.

A step 302 includes: delivering, by a PDCP entity of the receiver, a currently stored service data unit (SDU) to the SDAP entity of the receiver in sequence, and releasing the PDCP entity after completion of the delivery.

A step 303 includes: processing, by the SDAP entity, the SDU from the PDCP entity, and delivering a resultant data packet to an upper layer or a higher layer relative to the SDAP entity.

A step 304 includes: determining, by the SDAP entity, whether the processing of the SDU from the PDCP entity is completed; performing the step of determining whether the current radio bearer is the only radio bearer corresponding to the SDAP entity in case that the processing of the SDU from the PDCP entity is completed; otherwise, returning to the step 303.

It should be noted that the current radio bearer includes one radio bearer or at least two radio bearers, for example, three radio bearers, four radio bearers, etc.

A step 305 includes: determining whether a current radio bearer is an only radio bearer corresponding to a service data adaptation protocol (SDAP) entity; proceeding to a step 306 in case that the current radio bearer is the only radio bearer corresponding to the SDAP entity; proceeding to a step 307 in case that the current radio bearer is not the only radio bearer corresponding to the SDAP entity.

A step 306 includes: releasing the SDAP entity.

A step 307 includes: releasing a configuration corresponding to the current radio bearer.

In this way, the embodiments of the present disclosure provide a data processing solution for the receiver in a scenario of radio bearer release or PDCP entity release.

Figure 4:
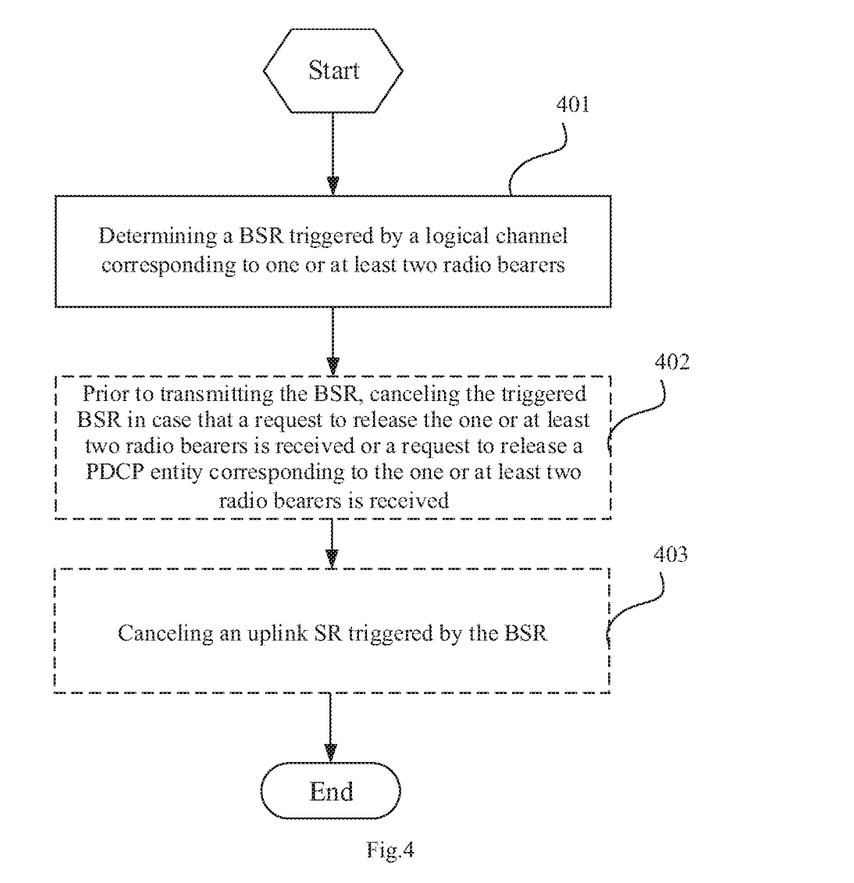
FIG. 4 is a fourth flow diagram illustrating a data processing method according to an embodiment of the present disclosure.

Referring to FIG. 4, a process of a data processing method according to an embodiment of the present disclosure is illustrated. The method is executed by a transmitter, and the transmitter may be a user terminal. The method includes specific steps as follows.

A step 401 includes: determining a buffer status report (BSR) triggered by a logical channel corresponding to one or at least two radio bearers.

In the embodiment of the present disclosure, optionally, a BSR of a medium access control (MAC) entity triggered by the logical channel corresponding to the one or at least two radio bearers is determined.

A step 402 includes: prior to transmitting the BSR, canceling the triggered BSR in case that a request to release the one or at least two radio bearers is received or a request to release a PDCP entity corresponding to the one or at least two radio bearers is received.

A step 403 includes: canceling an uplink scheduling request (SR) triggered by the BSR.

It should be noted that the above step 403 is an optional step.

In this way, in the embodiment of the present disclosure, a process for the transmitter to cancel a processing of the BSR or a processing of the BSR and the SR is provided, so as to improve the system processing mechanism.

Embodiments of the present disclosure also provide a receiver. Since the receiver has a principle of problem-solving that is similar to the data processing method in the embodiment of the present disclosure, for an implementation of the receiver, a reference may be made to the implementation of the method, and a repeated description is omitted herein.

Figure 5:
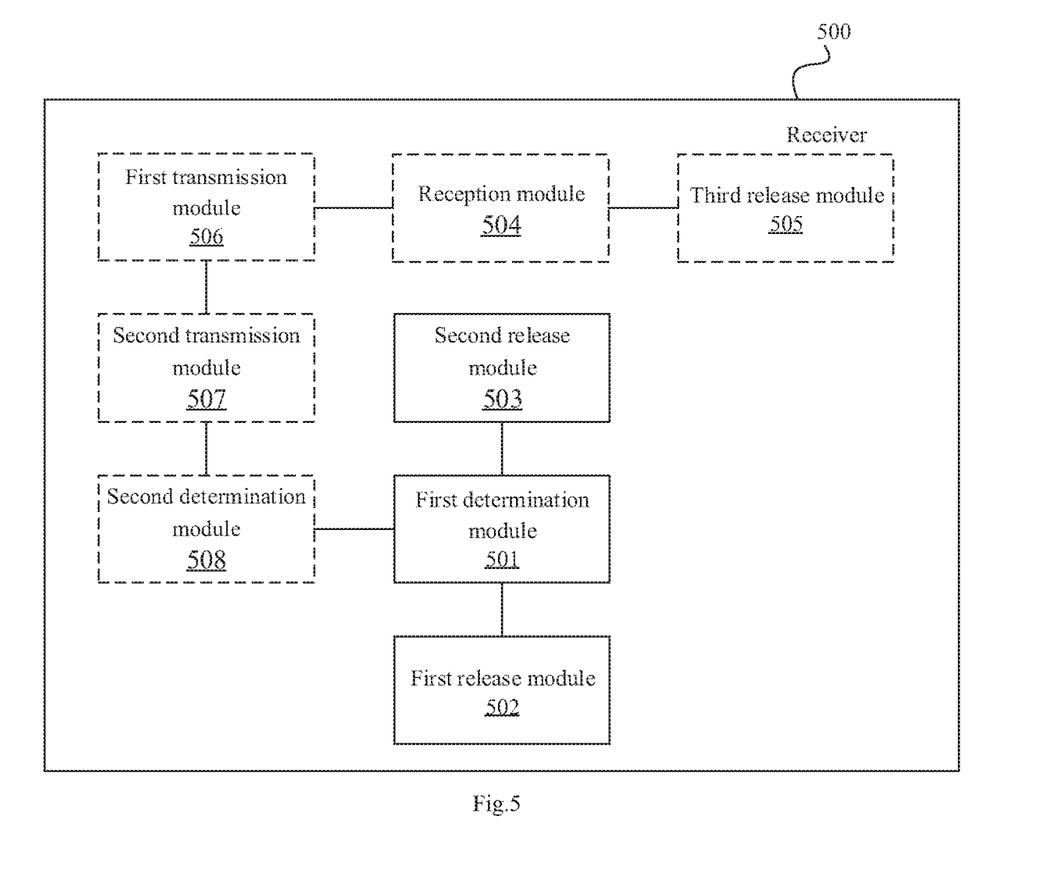
FIG. 5 is a first schematic diagram illustrating a structure of a receiver according to an embodiment of the present disclosure.

Referring to FIG. 5, a structure of a receiver is illustrated, and the receiver 500 includes:
- a first determination module 501, configured to determine whether a current radio bearer is an only radio bearer corresponding to a service data adaptation protocol (SDAP) entity of the receiver;
- a first release module 502, configured to release the SDAP entity in case that the first determination module determines that the current radio bearer is the only radio bearer corresponding to the SDAP entity;
- a second release module 503, configured to release a configuration corresponding to the current radio bearer in case that the first determination module determines that the current radio bearer is not the only radio bearer corresponding to the SDAP entity.

Optionally, referring to FIG. 5, the receiver 500 further includes: a reception module 504, configured to receive a radio bearer release indication or a packet data convergence protocol (PDCP) entity release indication from a higher layer.

With continued reference to FIG. 5, in the embodiment of the present disclosure, optionally, the receiver 500 further includes:
- a third release module 505, configured to release a PDCP entity of the receiver.

With continued reference to FIG. 5, in the embodiment of the present disclosure, optionally, the receiver 500 further includes:
- a first transmission module 506, configured to deliver, by a PDCP entity of the receiver, a currently stored service data unit (SDU) to the SDAP entity of the receiver in sequence, and release the PDCP entity after completion of the delivery;
- a second transmission module 507, configured to process, by the SDAP entity, the SDU from the PDCP entity, and deliver a resultant data packet to an upper layer or a higher layer relative to the SDAP entity;
- a second determination module 508, configured to determine, by the SDAP entity, whether the processing of the SDU from the PDCP entity is completed; instruct the first determination module to determine whether the current radio bearer is the only radio bearer corresponding to the SDAP entity in case that the processing of the SDU from the PDCP entity is completed.

In the embodiment of the present disclosure, optionally, there are one or at least two current radio bearers.

The receiver provided in the present embodiment may implement the above method embodiment, the implementation principle and technical effect thereof are similar, which are not described again in the present embodiment.

The embodiment of the present disclosure also provides a transmitter. Since the transmitter has a principle of problem-solving that is similar to the data processing method in the embodiment of the present disclosure, for an implementation of the transmitter, a reference may made to the implementation of the method, and a repeated description is omitted herein.

Figure 6:
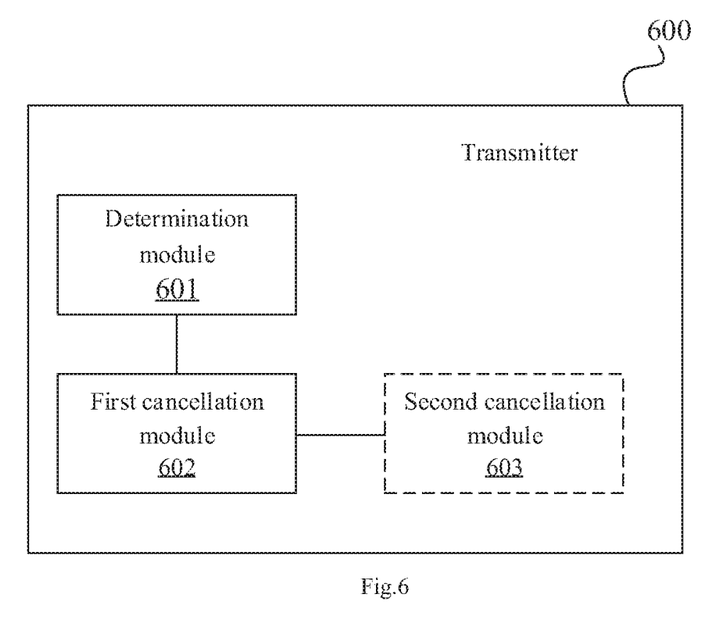
FIG. 6 is a first schematic diagram illustrating a structure of a transmitter according to an embodiment of the present disclosure.

Referring to FIG. 6, a structure of a transmitter is illustrated, and the transmitter 600 includes:
- a determination module 601, configured to determine a buffer status report (BSR) triggered by a logical channel corresponding to one or at least two radio bearers;
- a first cancellation module 602, configured to, prior to transmitting the BSR, cancel the triggered BSR in case that a request to release the one or at least two radio bearers is received or a request to release a PDCP entity corresponding to the one or at least two radio bearers is received.

With continued reference to FIG. 6, in the embodiment of the present disclosure, optionally, the transmitter 600 further includes:
- a second cancellation module 603, configured to cancel an uplink scheduling request (SR) triggered by the BSR.

In the embodiment of the present disclosure, optionally, the determination module 601 is further configured to: determine a BSR of a medium access control MAC entity triggered by a logical channel corresponding to the one or at least two radio bearers.

The transmitter provided in the present embodiment can implement the above method embodiment, the implementation principle and technical effect thereof are similar, which are not described again in the present embodiment.

Figure 7:
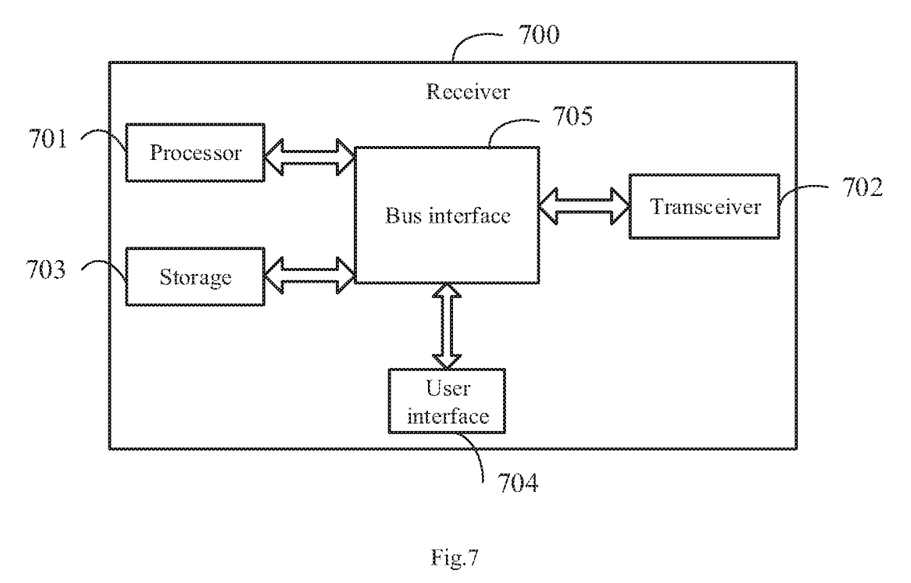
FIG. 7 is a second schematic diagram illustrating a structure of a receiver according to an embodiment of the present disclosure.

Referring to FIG. 7, a structural diagram of a receiver to which an embodiment of the present disclosure is applied is illustrated. The receiver may implement details of the data processing method and achieve the same effect. A network side device is taken as an example of the receiver hereinafter.

As shown in FIG. 7, the receiver 700 includes: a processor 701, a transceiver 702, a storage 703, a user interface 704 and a bus interface 705.

In the embodiment of the present disclosure, the receiver 700 further includes a data processing program stored in the storage 703 and executable by the processor 701. The data processing program is configured to be executed by the processor 701 to implement the following steps: determining whether a current radio bearer is an only radio bearer corresponding to a Service data adaptation protocol (SDAP) entity of the receiver; releasing the SDAP entity in case that the current radio bearer is the only radio bearer corresponding to the SDAP entity; releasing a configuration corresponding to the current radio bearer in case that the current radio bearer is not the only radio bearer corresponding to the SDAP entity.

In FIG. 7, a bus architecture may include any number of interconnected buses and bridges. Various circuits, specifically, one or at least two processors represented by the processor 701 and a storage represented by the storage 703, are linked together. The bus architecture may also link various other circuits such as peripherals, voltage regulators and power management circuits, which are well known in the art, and therefore a further description is omitted herein. The bus interface 705 provides interfaces. The transceiver 702 may be at least two elements, that is, includes a transmitter and a receiver, to provide units configured to communicate with various other apparatuses over a transmission medium. For different user equipment, the user interface 704 may also be an interface capable of externally and/or internally connecting the required devices which including but not limited to a keypad, a display, a speaker, a microphone, a joystick, and the like.

The processor 701 is responsible for managing the bus architecture and general processing, and the storage 703 can store data used by the processor 701 when performing operations.

Optionally, the data processing program is configured to be executed by the processor 701 to implement the following step: receiving a radio bearer release indication or a packet data convergence protocol (PDCP) entity release indication from a higher layer.

Optionally, the data processing program is configured to be executed by the processor 701 to implement the following steps: delivering, by a PDCP entity of the receiver, a currently stored service data unit (SDU) to the SDAP entity of the receiver in sequence, and releasing the PDCP entity after completion of the delivery; processing, by the SDAP entity, the SDU from the PDCP entity, and delivering a resultant data packet to an upper layer or a higher layer relative to the SDAP entity; determining, by the SDAP entity, whether the processing of the SDU from the PDCP entity is completed; performing the step of determining whether the current radio bearer is the only radio bearer corresponding to the SDAP entity in case that the processing of the SDU from the PDCP entity is completed.

Figure 8:
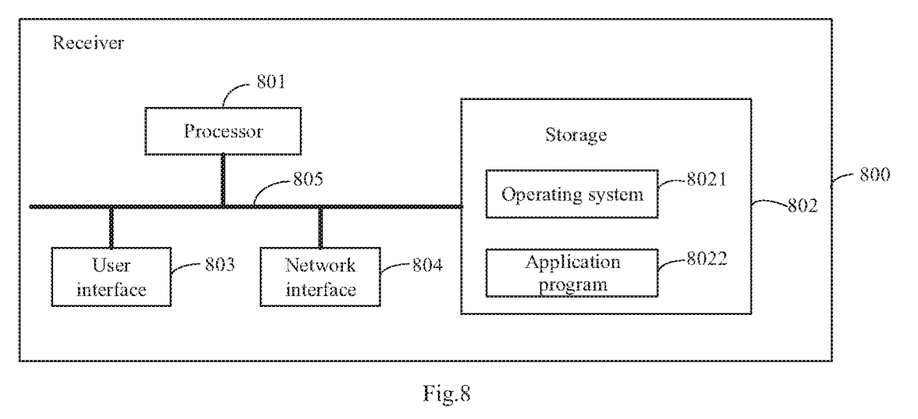
FIG. 8 is a third schematic diagram illustrating a structure of a receiver according to an embodiment of the present disclosure.

Referring to FIG. 8, a structural diagram of a receiver to which an embodiment of the present disclosure is applied is illustrated. The receiver may implement details of the data processing method and achieve the same effect. A user terminal is taken as an example of the receiver hereinafter.

FIG. 8 is a schematic diagram illustrating a structure of a receiver provided by another embodiment of the present disclosure. As shown in FIG. 8, the receiver 800 as shown in FIG. 8 includes: at least one processor 801, a storage 802, at least one network interface 804 and a user interface 803. The various components in the receiver 800 are coupled together by a bus system 805. It will be appreciated that the bus system 805 is configured to enable connection and communication between these components. The bus system 805 includes a power bus, a control bus, and a status signal bus in addition to the data bus. However, for clarity of description, various buses are all labeled as the bus system 805 in FIG. 8.

The user interface 803 may include a display, a keyboard, a point-and-click device (e.g., a mouse, a trackball), a touchpad, or a touch screen, etc.

It is to be understood that the storage 802 in the embodiments of the present disclosure can be either volatile storage or non-volatile storage, or can include both volatile and non-volatile storage. The non-volatile storage may be a read-only memory (ROM), a programmable ROM (PROM), an erasable PROM (EPROM), or an electrically EPROM (EEPROM) or a flash memory. The volatile storage may be a random access memory (RAM) that acts as an external cache. By way of example and not limitation, many forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM) and a direct Rambus RAM (DRRAM). The storage 802 of the systems and methods described in the embodiments of the present disclosure is intended to include, but is not limited to, these and any other suitable types of memory.

In some embodiments, the storage 802 stores the following elements, an executable module or a data structure, or a subset thereof, or an extended set thereof: an operating system 8021 and an application program 8022.

The operating system 8021 includes various system programs, such as a framework layer, a core library layer, a driver layer, and the like, for implementing various basic services and processing hardware-based tasks. The application program 8022 includes various application programs, such as a media player, a browser, and the like, for implementing various application services. A program implementing the methods of embodiments of the present disclosure may be included in the application program 8022.

In the embodiment of the present disclosure, by calling and executing a program or instruction stored in the storage 802, specifically, the program or instruction stored in the application program 8022, the following steps are implemented: determining whether a current radio bearer is an only radio bearer corresponding to a service data adaptation protocol (SDAP) entity of the receiver; releasing the SDAP entity in case that the current radio bearer is the only radio bearer corresponding to the SDAP entity; releasing a configuration corresponding to the current radio bearer in case that the current radio bearer is not the only radio bearer corresponding to the SDAP entity.

The method disclosed in the foregoing embodiment of the present disclosure may be applied to the processor 801 or implemented by the processor 801. The processor 801 may be an integrated circuit chip having a signal processing capability. During an implementation process, steps of the method may be realized in form of hardware by integrated logical circuits in the processor 801, or in form of software by instructions. The processor 801 may be a general purpose processor, digital signal processor (DSP), application specific integrated circuit (ASIC), field-programmable gate array (FPGA) or other programmable logic device, discrete gate or transistor logic device, discrete hardware component, that may implement or perform various methods, steps, and logical block diagrams disclosed in the embodiments of the present disclosure. The general purpose processor may be a microprocessor, any conventional processor, or the like. The steps of the method disclosed in the embodiment of the present disclosure may be embodied directly by the hardware decoding processor, or by a combination of hardware and software modules in the hardware decoding processor. The software modules may reside in well-established storage medium in the art, such as a RAM, flash memory, ROM, PROM or EEPROM, register, and the like. The storage medium resides in the storage 802. The processor 801 reads information from the storage 802 and performs the steps of the methods with its hardware.

It is to be understood that the embodiments described in embodiments of the present disclosure can be implemented in hardware, software, firmware, middleware, microcode, or any combination thereof. For hardware implementation, processing units may be implemented in one or more application specific integrated circuits (ASIC), digital signal processor (DSP), DSP device (DSPD), programmable logic device (PLD), field programmable gate array (FPGA), general purpose processor, controller, microcontroller, microprocessor, other electronic unit configured to perform the function described in the present disclosure or a combination thereof.

For software implementation, the techniques described in embodiments of the present disclosure can be implemented by modules (e.g., procedures, functions, etc.) that perform the functions described in the embodiments of the present disclosure. The software code can be stored in the storage and executed by the processor. The storage can be implemented internal or external to the processor.

Optionally, the computer program is configured to be executed by the processor 801 to implement the following step:

receiving a radio bearer release indication or a packet data convergence protocol (PDCP) entity release indication from a higher layer.

Optionally, the computer program is configured to be executed by the processor 801 to implement the following steps:

delivering, by a PDCP entity of the receiver, a currently stored service data unit (SDU) to the SDAP entity of the receiver in sequence, and releasing the PDCP entity after completion of the delivery;

processing, by the SDAP entity, the SDU from the PDCP entity, and delivering a resultant data packet to an upper layer or a higher layer relative to the SDAP entity;

determining, by the SDAP entity, whether the processing of the SDU from the PDCP entity is completed;

performing the step of determining whether the current radio bearer is the only radio bearer corresponding to the SDAP entity in case that the processing of the SDU from the PDCP entity is completed.

Figure 9:
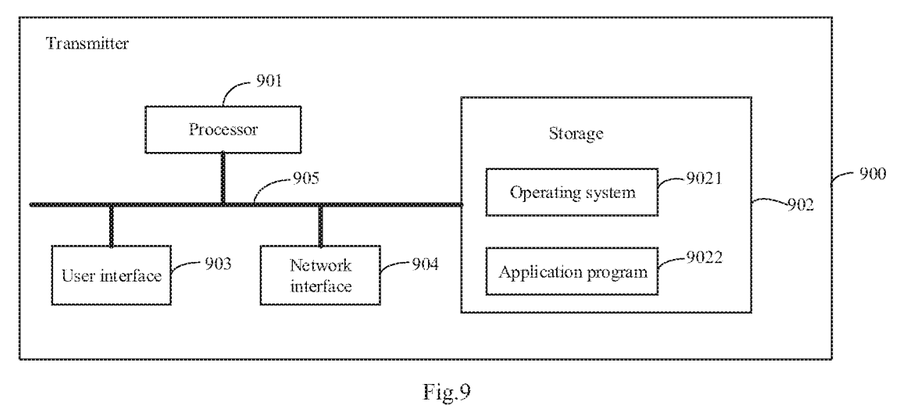
FIG. 9 is a second schematic diagram illustrating a structure of a transmitter according to an embodiment of the present disclosure.

FIG. 9 is a schematic diagram illustrating a structure of a transmitter provided by another embodiment of the present disclosure. As shown in FIG. 9, the transmitter 900 as shown in FIG. 9 includes: at least one processor 901, a storage 902, at least one network interface 904 and a user interface 903. The various components in the transmitter 900 are coupled together by a bus system 905. It will be appreciated that the bus system 905 is configured to enable connection and communication between these components. The bus system 905 includes a power bus, a control bus, and a status signal bus in addition to the data bus. However, for clarity of description, various buses are all labeled as the bus system 905 in FIG. 9.

The user interface 903 may include a display, a keyboard, a point-and-click device (e.g., a mouse, a trackball), a touchpad, or a touch screen, etc.

It is to be understood that the storage 902 in the embodiments of the present disclosure can be either volatile storage or non-volatile storage, or can include both volatile and non-volatile storage. The non-volatile storage may be a read-only memory (ROM), a programmable ROM (PROM), an erasable PROM (EPROM), or an electrically EPROM (EEPROM) or a flash memory. The volatile storage may be a random access memory (RAM) that acts as an external cache. By way of example and not limitation, many forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a synchronous link DRAM (SLDRAM) and a direct Rambus RAM (DRRAM). The storage 902 of the systems and methods described in the embodiments of the present disclosure is intended to include, but is not limited to, these and any other suitable types of memory.

In some embodiments, the storage 902 stores the following elements, an executable module or a data structure, or a subset thereof, or an extended set thereof: an operating system 9021 and an application program 9022.

The operating system 9021 includes various system programs, such as a framework layer, a core library layer, a driver layer, and the like, for implementing various basic services and processing hardware-based tasks. The application program 9022 includes various application programs, such as a media player, a browser, and the like, for implementing various application services. A program implementing the methods of embodiments of the present disclosure can be included in the application program 9022.

In the embodiment of the present disclosure, by calling and executing a program or instruction stored in the storage 902, specifically, the program or instruction stored in the application program 9022, the following steps are implemented: determining a buffer status report (BSR) triggered by a logical channel corresponding to one or at least two radio bearers; prior to transmitting the BSR, canceling the triggered BSR in case that a request to release the one or at least two radio bearers is received or a request to release a PDCP entity corresponding to the one or at least two radio bearers is received.

The method disclosed in the foregoing embodiment of the present disclosure may be applied to the processor 901 or implemented by the processor 901. The processor 901 may be an integrated circuit chip having a signal processing capability. During an implementation process, steps of the method may be realized in form of hardware by integrated logical circuits in the processor 901, or in form of software by instructions. The processor 901 may be a general purpose processor, digital signal processor (DSP), application specific integrated circuit (ASIC), field-programmable gate array (FPGA) or other programmable logic device, discrete gate or transistor logic device, discrete hardware component that may implement or perform various methods, steps, and logical block diagrams disclosed in the embodiments of the present disclosure. The general purpose processor may be a microprocessor, any conventional processor, or the like. The steps of the methods disclosed in the embodiments of the present disclosure may be embodied directly by the hardware decoding processor, or by a combination of hardware and software modules in the hardware decoding processor. The software modules may reside in well-established storage medium in the art, such as a RAM, flash memory, ROM, PROM or EEPROM, register, and the like. The storage medium resides in the storage 902. The processor 901 reads information from the storage 902 and performs the steps of the methods with its hardware.

It is to be understood that the embodiments described in embodiments of the present disclosure can be implemented in hardware, software, firmware, middleware, microcode, or any combination thereof. For hardware implementation, processing units may be implemented in one or at least two application specific integrated circuits (ASIC), digital signal processor (DSP), DSP device (DSPD), programmable logic device (PLD), field-programmable gate array (FPGA), general purpose processor, controller, microcontroller, microprocessor, other electronic unit configured to perform the function described in the present disclosure or a combination thereof.

For software implementation, the techniques described in embodiments of the present disclosure can be implemented by modules (e.g., procedures, functions, etc.) that perform the functions described in the embodiments of the present disclosure. The software code can be stored in the storage and executed by the processor. The storage can be implemented internal or external to the processor.

A computer readable storage medium is further provided by an embodiment of the present disclosure, where a data processing program is stored in the computer readable storage medium, the data processing program is executed by a processor to implement steps of the above-mentioned data processing method.

A person skilled in the art may be aware that, the exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art can use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, at least two units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on at least two network units. A part or all of the units may be selected according to actual needs to achieve the objectives of the solutions of the embodiments of the present disclosure.

In addition, various functional units in various embodiments of the present disclosure may be integrated into one processing unit, or each of the units may exist alone physically, or two or more units may be integrated into one unit.

If the function is implemented in form of software functional unit and sold or used as an independent product, it may be stored in a computer readable storage medium. Based upon such understanding, essential parts, or parts contributing to the related art, of the technical solution of the present disclosure may be implemented in a form of a computer program product which can be stored in a storage medium and which includes several instructions to cause a computer device (which may be a personal computer, a server, or a network device, etc.) to perform all or some steps of the method according to the respective embodiments of the present disclosure. The foregoing storage medium includes various media that can store program codes, such as a USB flash drive, a mobile hard disk, a ROM, a RAM, a magnetic disk, or an optical disc, etc.

The aforementioned are merely specific implementations of the present disclosure, but the scope of the disclosure is by no means limited thereto. Any modifications or substitutions that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A data processing method, applied to a receiver, comprising:
   determining whether a current radio bearer is an only radio bearer corresponding to a service data adaptation protocol (SDAP) entity of the receiver;
   releasing the SDAP entity in case that the current radio bearer is the only radio bearer corresponding to the SDAP entity;
   releasing a configuration corresponding to the current radio bearer in case that the current radio bearer is not the only radio bearer corresponding to the SDAP entity;
   wherein the method further comprises:
   prior to the determining whether the current radio bearer is the only radio bearer corresponding to the SDAP entity of the receiver, receiving a radio bearer release indication or a packet data convergence protocol (PDCP) entity release indication from a higher layer;
   delivering, by a PDCP entity of the receiver, a currently stored service data unit (SDU) to the SDAP entity of the receiver in sequence after the receiving the radio bearer release indication or the PDCP entity release indication from the higher layer, and releasing the PDCP entity after completion of the delivery;
   processing, by the SDAP entity, the SDU from the PDCP entity, and delivering a resultant data packet to an upper layer or higher layer relative to the SDAP entity;
   determining, by the SDAP entity, whether the processing of the SDU from the PDCP entity is completed;
   performing the determining whether the current radio bearer is the only radio bearer corresponding to the SDAP entity in case that the processing of the SDU from the PDCP entity is completed.

2. The data processing method according to claim 1, wherein the current radio bearer comprises one radio bearer or at least two radio bearers.

3. A receiver, comprising a processor, a storage, and a data processing program stored in the storage and configured to be executed by the processor, wherein the processor is configured to execute the data processing program, to implement steps of the data processing method according to claim 1.

4. The receiver according to claim 3, wherein the current radio bearer comprises one radio bearer or at least two radio bearers.

5. A computer readable storage medium storing therein a data processing program, wherein the data processing program is configured to be executed by a processor, to implement steps of the data processing method according to claim 1.

* * * * *